July 17, 1962     H. C. ALLENDORFER     3,044,148
ROLL DRESSING TOOL AND HOLDER
Filed June 11, 1959                       2 Sheets-Sheet 1
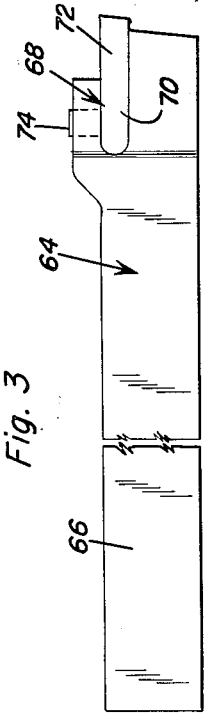
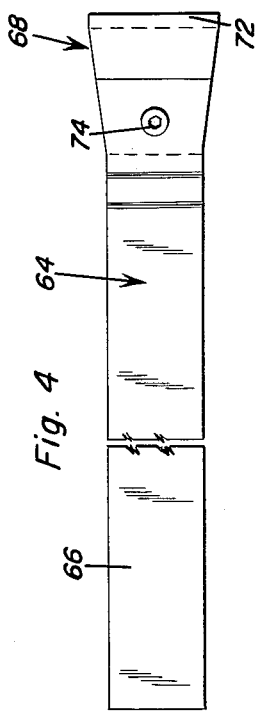
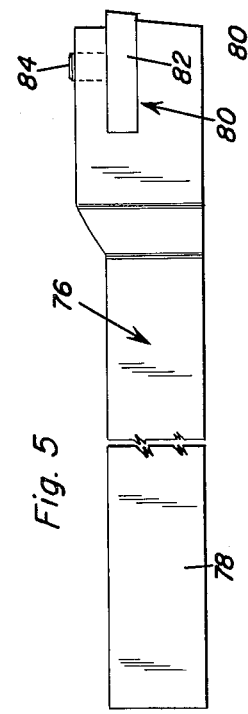
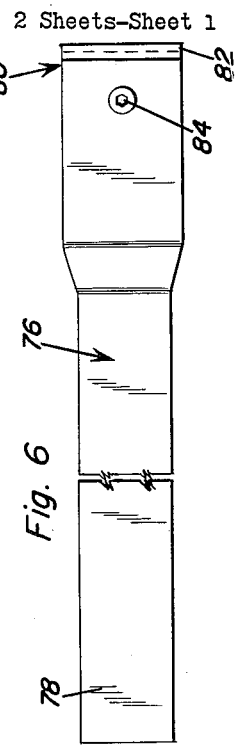
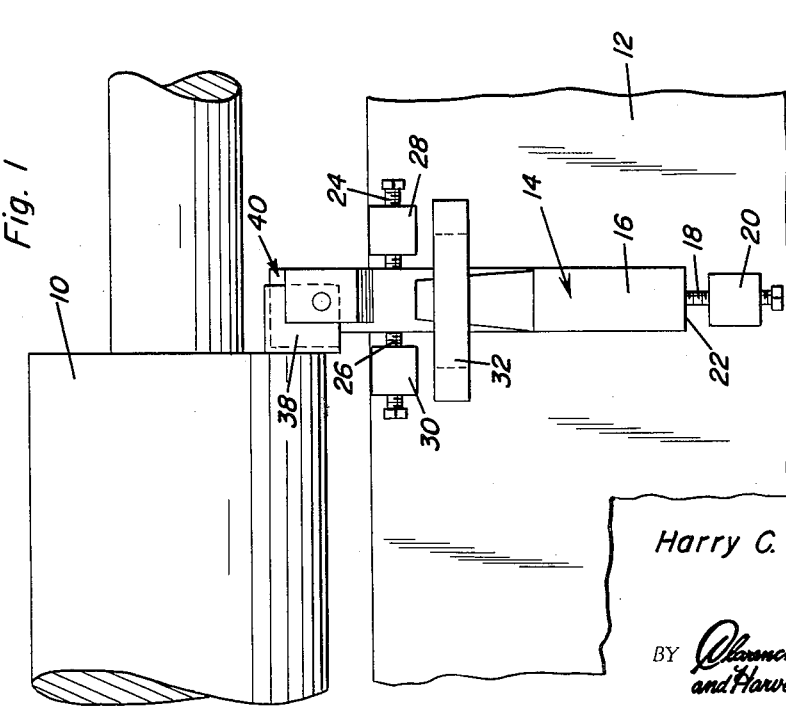
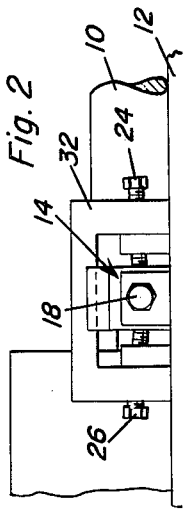
Harry C. Allendorfer
INVENTOR.

July 17, 1962  H. C. ALLENDORFER  3,044,148
ROLL DRESSING TOOL AND HOLDER
Filed June 11, 1959  2 Sheets-Sheet 2
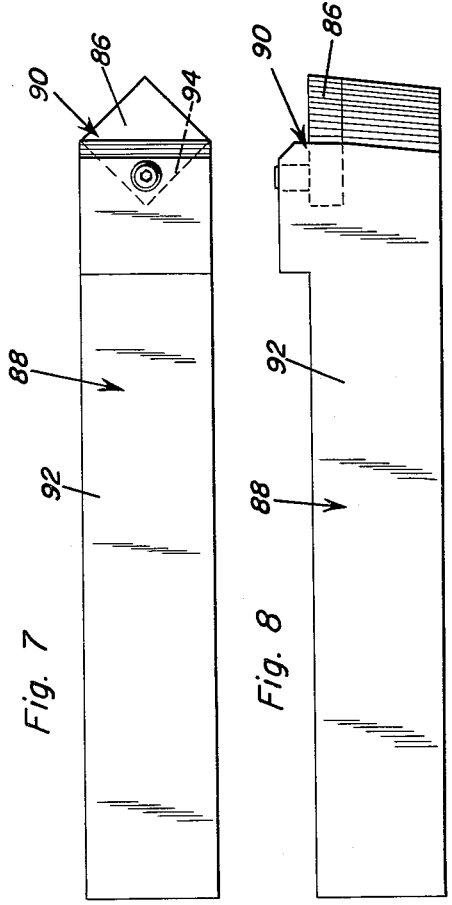
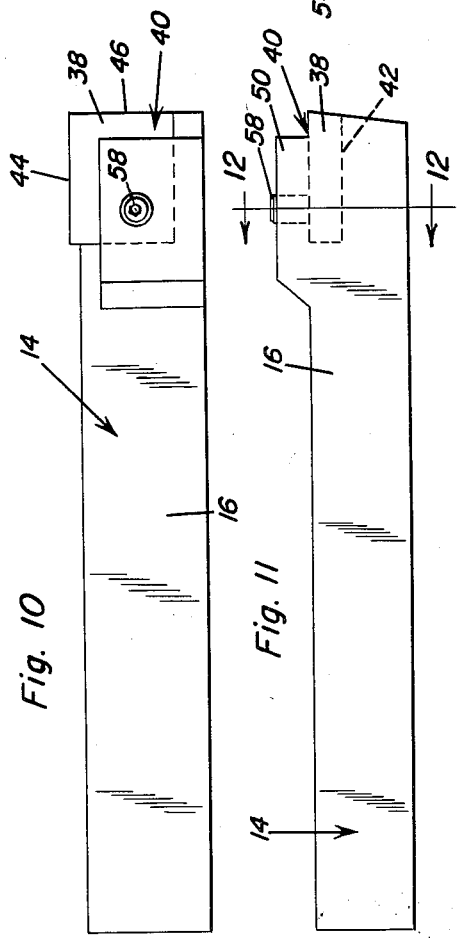
Harry C. Allendorfer
INVENTOR.

United States Patent Office 3,044,148
Patented July 17, 1962

3,044,148
ROLL DRESSING TOOL AND HOLDER
Harry C. Allendorfer, 80 Bucknell Ave., Johnstown, Pa.
Filed June 11, 1959, Ser. No. 819,620
3 Claims. (Cl. 29—96)

This invention relates to improvements in machine tools, and more particularly to holders for high speed steel inserts that are particularly useful for roll turning and redressing used in the steel industry for rolling different shapes and bar stock.

An object of the invention is to provide a holder for high speed steel inserts which may be changed from one cutting edge to another without removing the holder from the machine.

A further object of the invention is to provide a special holder designed in such a way that the pressure of the turning roll against the cutting edge works to hold the tip securely in place. Consequently, as the holder is supported on the cutting table and as it is used in the ordinary way, the insert is very firmly held in place, thereby avoiding the necessity of brazing the tip to the holder.

Consequently, the design hardness is retained in the high speed steel cutting tip or insert, and this lengthens the effective life of the expensive cutting tip, thereby significantly reducing the over-all cost of machining and redressing rolls.

One of the important advantages of the invention is that the insert has two to four cutting edges and it is possible to have even a greater number of cutting edges, which may be used before it is necessary to regrind the tool. The insert may be turned quickly to the new cutting edge without removing the holder, thereby doubling, quadrupling or, in other special cases, further increasing the time each tool is in the machine before regrinding becomes necessary.

A tool holder constructed in accordance with the invention may be made in various sizes. As the size of the high speed steel cutting tip insert is reduced by regrinding, it may be used in the next smaller size holder. This permits maximum utilization of each piece of expensive high speed steel with the resulting reduction of waste and over-all machining and redressing costs.

Briefly, the holder is made of a shank with a special pocket-like support at one end within which to retain the insert tip. A setscrew, or the like, is carried by the special clamp merely to hold the insert in place and is not the main thrust receiving component of the holder. The shape of the clamp at the inner end of the shank is such that the turning roll wedges or binds the insert in place in the clamp and this is the main support for the insert when it is in normal operation.

These together with other objects and advantages which will become subsequently apparent reside in the details of construction and operation as more fully hereinafter described and claims, reference being had to the accompanying drawings forming a part hereof, wherein like numerals refer to like parts throughout, and in which:

FIGURE 1 is a fragmentary top view showing the cutting table and a part of a roll, together with an insert in accordance with the invention.

FIGURE 2 is an end view of the structural organization shown in FIGURE 1.

FIGURE 3 is a side view of one form of holder.
FIGURE 4 is a top view of the holder in FIGURE 3.
FIGURE 5 is a side view of another form of holder.
FIGURE 6 is a top view of the holder in FIGURE 5.
FIGURE 7 is a top view of a further form of holder.
FIGURE 8 is a side view of the holder in FIGURE 7.
FIGURE 9 is an end view of the holder of FIGURE 7.
FIGURE 10 is a top view of a further embodiment of the invention.

FIGURE 11 is a side elevational view of the holder in FIGURE 10.
FIGURE 12 is a cross-sectional view taken on the line 12—12 of FIGURE 11.

In the accompanying drawings there is a roll 10 illustrated together with a cutting table 12 on which holder 14 is supported. Each of the holders has a shank and therefore holder 12 (FIGURES 1 and 2) is equipped with shank 16 that is essentially square in cross-section and which is elongate. Setscrew 18 carried by fixed support 20 having a threaded bore engages one end 22 of holder shank 16. Setscrews 24 and 26, carried by threaded blocks 28 and 30 on table 12, engage the sides of shank 16 and are used to take side thrusts and to adjust the holder. Setscrew 18 accepts the endwise reaction of the holder and is used for setting up the holder in the machine. Arch clamp 32 is attached at its ends to table 12 and spans the shank of holder 16.

The above is a typical setup for typical holder 14, it being apparent that the machine may be set up in other ways consonant with shop practices. Holder 14 together with insert tip 38 thereof are shown in detail in FIGURES 10–12. Therefore, attention is first invited to this embodiment. The inner end of shank 16 is equipped with a clamp 40 of special construction. The clamp is in the form of a laterally and forwardly opening pocket 42 in which insert tip 38 is disposed. This holder is used principally for side dressing of passes, and the insert tip has two cutting edges 44 and 46. Pocket 42 has an upper surface 48 formed by horizontal wall 50 and a lower surface 52 formed by a surface portion of the base of shank 16 at the inner end thereof. The pocket has an inner wall 54 whose inner surface 56 constitutes the inner reach of the pocket. Setscrew 58 or like fastener is carried by a threaded bore in wall 50 and engages the top surface of the insert tip. The setscrew is merely a quick and easy way to hold the insert tip fastened in the pocket of clamp 40. The principal reaction developed during turning roll 10 is received in the top wall 50 of the clamp. When cutting edge 44 becomes worn, it is merely exchanged for cutting edge 46 without the necessity of doing anything more than loosening setscrew 58 and reversing the tip insert in the clamp.

Attention is now directed to FIGURES 3 and 4. Holder 64 has a shank 66 essentially the same as shank 16. A clamp 68 having a pocket 70 type construction is at the inner end of shank 66. As seen in plan form (FIGURE 4), the clamp has outwardly tapered edges, and the insert tip 72 is shaped to conform thereto. The insert tip is held centered by means of setscrew 74 identical to setscrew 58 in both construction and function. Holder 64 is used mainly in plunging cuts.

Referring now to FIGURES 5 and 6, the holder 76 is shown in detail. Here again, the shank 78 of holder 76 is essentially the same as the other holders, and the clamp 80 is very similar to the previously described clamps, noting that clamps 80 and 68 have two open sides rather than only one as disclosed in FIGURES 10–12. Holder tip 82 is held in place in clamp 80 by means of setscrew 84 which is the same as the previously described setscrews. The purpose of holder 76 is principally for plunge cutting and re-dressing square passes. Consequently, the insert tip 82 may have four cutting edges, each of which is usable before the insert tip has to be removed and reground.

FIGURES 7–9 disclose insert tip 86 carried by holder 88 in clamp structure 90 thereof. Holder 88 is used principally for re-dressing diamond-shaped passes, and the insert tip 86 has four cutting edges. Holder 88 has a shank 92 which is essentially the same as the previously described shanks, and the clamp 90 is similar to the other clamps, that is, it has in common with the other clamps the fact that it is made of a forwardly opening pocket. It is more similar to clamp 40 than the other clamps because the pocket 94 is V-shaped whereby both sides are closed (FIGURES 8 and 9).

All of the disclosed holders have clamps which include forwardly opening pockets, but note that each holder has the upper wall thereof somewhat shorter than the lower wall thereof so that the full or practically the full bottom surface of the insert tip is mechanically supported by a forwardly projecting portion of the holder shank in the region of the clamp. Further, note that the forward edge of the holder shank is tapered rearwardly so as to assure leaving proper clearance between the work and the forward part of each holder when it is being used for its specific purpose. In each instance (see side views), the clamp upper wall preferably rises above the general plane of the outer part of the shank, thereby having a copious quantity of stock in the region of the clamp and especially the upper wall of the pocket of the clamp which receives the reaction thrusts during normal operation of the holder and the insert tip carried by the holder.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cutting tool comprising a tool holder having a shank portion having an outer part defining a general feed cutting plane and a cross-sectionally enlarged head connected thereto, said head having a pocket extending inwardly from a front cutting side of the head parallel to said feed cutting plane, a cutting tip insert fitted within said pocket in contact with all wall surfaces thereof and having a cutting face forwardly spaced from the head in a plane intersecting said cutting plane at a rake angle to form an upper cutting edge therewith, said pocket being formed between a rigid reaction wall portion of said head having a wall surface in said cutting plane for continuous smooth pressure contact with said insert and a parallel spaced supporting wall portion of said head having a continuous, smooth wall surface for friction contact with said insert, said supporting wall portion projecting forwardly beyond the reaction wall portion and having a front face on said front side of the head in a plane parallel to said cutting face of the insert.

2. The combination of claim 1, wherein said insert has a plurality of cutting faces any one of which may be exposed in forwardly spaced relation to the head by repositioning the insert within said pocket.

3. The combination of claim 2, wherein said pocket includes side surfaces interconnecting said wall surfaces of said reaction and supporting wall portions for positioning contact engagement with unexposed cutting faces of said insert.

References Cited in the file of this patent

UNITED STATES PATENTS

| | | |
|---|---|---|
| 1,318,830 | Bartlett | Oct. 14, 1919 |
| 1,409,960 | McKenzie | Mar. 21, 1922 |
| 2,037,642 | Seribner | Apr. 14, 1936 |
| 2,186,417 | Kraus | Jan. 9, 1940 |
| 2,375,916 | Grigalauski | May 15, 1945 |
| 2,402,650 | Maffia | June 25, 1946 |
| 2,414,811 | Hollis | Jan. 28, 1947 |
| 2,464,865 | Hollis | Mar. 22, 1949 |
| 2,520,655 | Reaney | Aug. 29, 1950 |
| 2,595,090 | Middleton | Apr. 29, 1952 |
| 2,607,254 | Auerbach | Aug. 19, 1952 |
| 2,641,049 | Kennicott | June 9, 1953 |
| 2,659,962 | Doerseln | Nov. 24, 1953 |
| 2,697,272 | Clark | Dec. 21, 1954 |
| 2,780,856 | Frayoff | Feb. 12, 1957 |
| 2,834,106 | Conder | May 13, 1958 |
| 2,838,827 | Wright | June 17, 1958 |
| 2,854,734 | Beck | Oct. 7, 1958 |
| 2,893,111 | Dedekind | July 7, 1959 |

OTHER REFERENCES

Article: "Chipheaders Brazed On" by W. B. Kennedy from "American Machinist" magazine, December 5, 1948.